United States Patent [19]

Munetsugu

[11] Patent Number: 4,571,690
[45] Date of Patent: Feb. 18, 1986

[54] ARITHMETIC OPERATION APPARATUS USING SOLAR CELLS

[75] Inventor: Eiichi Munetsugu, Yokohama, Japan

[73] Assignee: Tokyo Shibaura Denki Kabushiki Kaisha, Kawasaki, Japan

[21] Appl. No.: 480,003

[22] Filed: Mar. 29, 1983

[30] Foreign Application Priority Data

Mar. 30, 1982 [JP] Japan .................................. 57-52024

[51] Int. Cl.$^4$ ............................................. G06F 15/02
[52] U.S. Cl. ................................... 364/483; 364/705;
364/707; 323/906; 361/90; 340/662; 340/663
[58] Field of Search ....................... 364/483, 705, 707;
361/88, 90; 340/660, 661, 662, 663; 323/906,
221; 320/2; 354/484; 136/206, 291, 293

[56] References Cited

U.S. PATENT DOCUMENTS

| | | | |
|---|---|---|---|
| 4,234,920 | 11/1980 | Van Ness et al. | 364/200 |
| 4,264,962 | 4/1981 | Kodaira | 364/707 |
| 4,333,136 | 6/1982 | Baker | 323/906 |
| 4,375,662 | 5/1983 | Baker | 323/906 |
| 4,428,020 | 1/1984 | Blanchard | 361/90 |

OTHER PUBLICATIONS

"Microprocessor-Controlled Digital Shunt Regulator", by Chetty et al, published in IEEE Transactions on Aerospace and Electronic Systems, vol. AES-16, No. 2, Mar. 1980, pp. 191–201.

Patent Abstracts of Japan, vol. 6, No. 27, p. 102, Feb. 1982.

Patent Abstracts of Japan, vol. 6, No. 62, p. 111, Apr. 1982.

Primary Examiner—Gary Chin
Attorney, Agent, or Firm—Finnegan, Henderson, Farabow, Garrett & Dunner

[57] ABSTRACT

Two different set voltages are respectively compared with a power source voltage. When the smaller set voltage which is close to a minimum operating voltage of an arithmetic circuit coincides with the power source voltage, a clock signal generator, and hence the arithmetic circuit are stopped. When the power source voltage increases to coincide with the larger set voltage after the clock signal generator is stopped, the clock signal generator and hence the arithmetic circuit are restarted.

3 Claims, 4 Drawing Figures

ARITHMETIC OPERATION APPARATUS USING SOLAR CELLS

BACKGROUND OF THE INVENTION

The present invention relates to an arithmetic operation apparatus which uses solar cells as a power source and which is used with low power consumption for a compact electronic calculator and/or an electronic timepiece.

Along with development of large scale integrated circuits (LSI), many compact electronic calculators, electronic timepieces or the like, have electronic circuits comprised of a single LSI. The current consumption of each such LSI may be made lower than 10 μA at a voltage of 3 V, or 1.5 V when the LSI has a complementary metal oxide semiconductor (CMOS) structure. The development of LSI techniques allows new power source means to be used. Various types of dry cells have been used as the power source means for compact electronic equipment, such as compact electronic calculators and electronic timepieces. More particularly, a compact and lightweight dry cell which has a low current production has been used along with the low current consumption of the LSI. In the alternative, a solar cell has been recently used for the power source for the above-mentioned arithmetic operation apparatuses.

FIG. 1 is a block diagram showing the general arrangement of a compact electronic calculator using solar cells as the power source. In FIG. 1, solar cells 1 are connected in series with each other. The negative terminals of the solar cells 1 are commonly connected to a $V_{DD}$ terminal 4 of an LSI 3 through a resistor 2. The $V_{DD}$ terminal 4 supplies a power source voltage $V_{DD}$ (negative voltage). The positive terminals of the solar cells 1 are commonly connected to a $V_{SS}$ terminal 5 of the LSI 3. The $V_{SS}$ terminal 5 supplies a reference voltage $V_{SS}$ (positive voltage). A bypass capacitor 6 is parallel-connected between the $V_{DD}$ terminal 4 and the $V_{SS}$ terminal 5. A series circuit of light-emitting diodes (LEDs) 7 and 8 is also parallel-connected between the $V_{DD}$ terminal 4 and the $V_{SS}$ terminal 5. The LEDs 7 and 8 serve to prevent a surge voltage from being applied across the LSI 3 when the intensity of light incident on the solar cells 1 is very high. The resistor 2 and the capacitor 6 are arranged to prevent variations in the voltage applied across the LSI 3 even if the intensity of light incident on the solar cells 1 is abruptly changed.

The LSI 3 includes electronic circuits such as an arithmetic and logic unit, an oscillator and a display driver so as to execute a series of operations (i.e., from the execution of various types of operation to the generation of a display signal for displaying the operation results). A keyboard 9 and a liquid crystal display (LCD) 10 are connected to the LSI 3.

FIG. 2 is a graph showing general voltage-current characteristic curves and the load characteristics of the LSI 3, using the illuminance (Lux) as a parameter. As may be apparent from the graph, the power capacity of the solar cells increases when the illuminance increases. However, the power capacity of the solar cells decreases when the illuminance decreases. Therefore, when a solar cell is used as a power source, a constant voltage cannot be obtained, unlike a case in which any cell other than the solar cell, such as a silver-oxide cell, is used. An output voltage of the solar cell greatly changes in accordance with changes in the ambient illuminance and the orientation of the solar cell with respect to the light source.

A compact electronic calculator of FIG. 1 configuration has two statuses: a control signal reception ready status (i.e., key signal waiting status wherein the LSI 3 awaits a key signal from the keyboard 9); and an operating status wherein any desired operation may be executed after the key signal is received. Although some compact electronic calculators do not have these two statuses, a compact electronic calculator having the two functions is illustrated for the sake of simplicity. In general, the current consumption of the LSI 3 in the operating status is greater than that in the key signal waiting status. This is because the number of active circuits in the operating status is greater than that in the key signal waiting status.

A line L1 in the graph shown in FIG. 2 indicates the load characteristics of the LSI 3 in the key signal waiting status, whereas a line L2 indicates the load characteristics in the operation status. When illuminance is set corresponding to 150 Lux, a voltage of about $-2.22$ V corresponding to an intersection between the line L1 and a curve L4 is applied across the LSI 3. When the key signal is supplied to the LSI 3 which is then set to the operating status, a voltage of $-1.93$ V corresponding to an intersection between the line L2 and the curve L4 is applied across the LSI 3. In brief, when the key signal waiting status is changed to the operating status, the voltage of $-2.22$ V is changed to $-1.93$ V. However, the LSI 3 requires a minimum operating voltage $V_{DDmin}$. If the voltage applied across the LSI 3 becomes lower than the minimum operating voltage $V_{DDmin}$, the LSI 3 may operate erroneously or become inoperative. The voltage $V_{DDmin}$ is about $-2$ V for an LSI for a compact electronic calculator which has a rated operating voltage of $-3$ V. In order to operate the LSI which has the above-described voltage $V_{DDmin}$ using solar cells having the characteristics shown in FIG. 2, the LSI operates erroneously or becomes inoperative if illuminance is less than 150 Lux and hence the voltage applied across the LSI 3 is less than $-2$ V $V_{DDmin}$. In the conventional arithmetic operation apparatus which has solar cells as the power source, when the intensity of light incident on the solar cells is made lower than a predetermined level, the apparatus operates erroneously or becomes inoperative.

SUMMARY OF THE INVENTION

It is, therefore, an object of the present invention to provide an arithmetic operation apparatus using solar cells as a power source, and which may be stably operated across a wider intensity range of light incident on the solar cells.

In order to achieve the above object of the present invention, there is provided an arithmetic operation apparatus using solar cells as a power source, comprising: an arithmetic and logic unit for executing various types of operations; a clock signal generator for generating a clock signal to be used as a sync signal in said arithmetic and logic unit; first and second voltage comparators for respectively comparing an absolute value of a first voltage with that of a power source voltage and an absolute value of a second voltage with that of the power source voltage, and for respectively producing logic signals in accordance with the comparison results, the absolute value of the first voltage being smaller than that of the second voltage; and a control circuit for interrupting generation of the clock signal from said clock signal generator when said first voltage comparator determines a coincidence between the absolute values of the first voltage and the power source voltage, and for restarting said clock signal generator when said second voltage comparator determines a coincidence between the absolute values of the second voltage and the power source voltage after a clock signal interruption.

DETAILED DESCRIPTION OF THE PREFERRED EMBODIMENT

Figure 1:
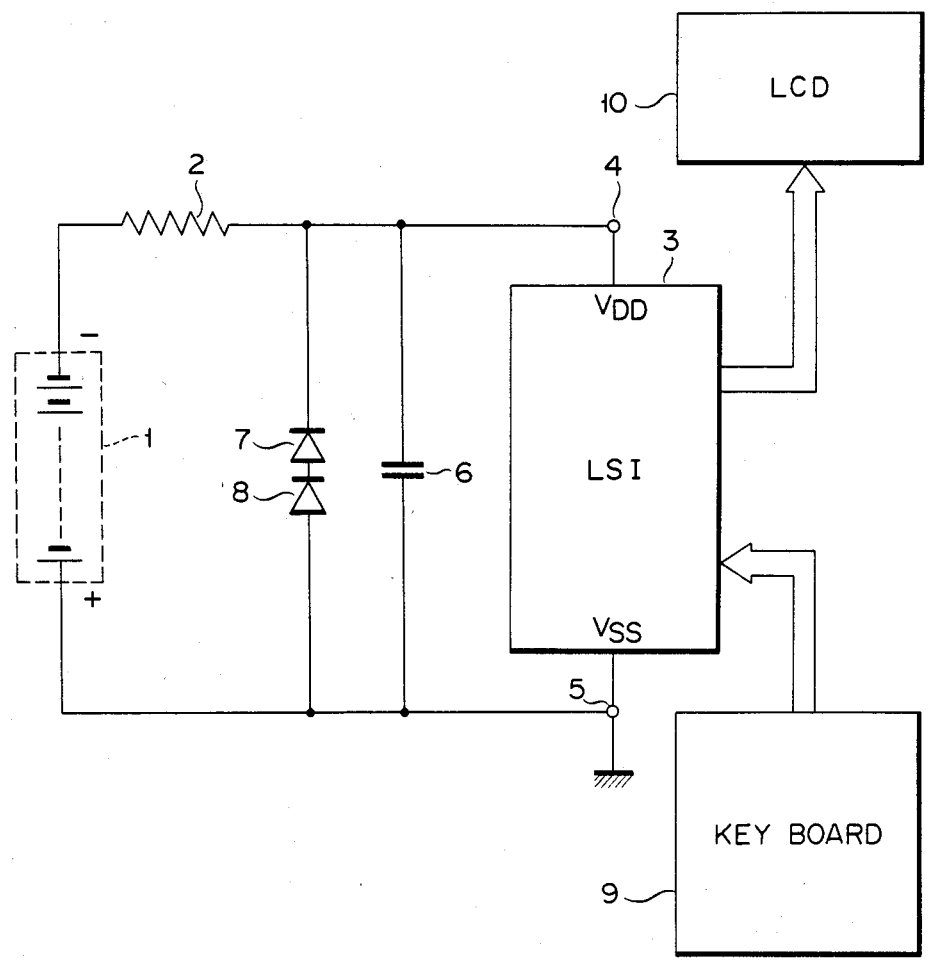
FIG. 1 is a block diagram of a conventional compact electronic calculator which uses solar cells as a power source.
Figure 3:
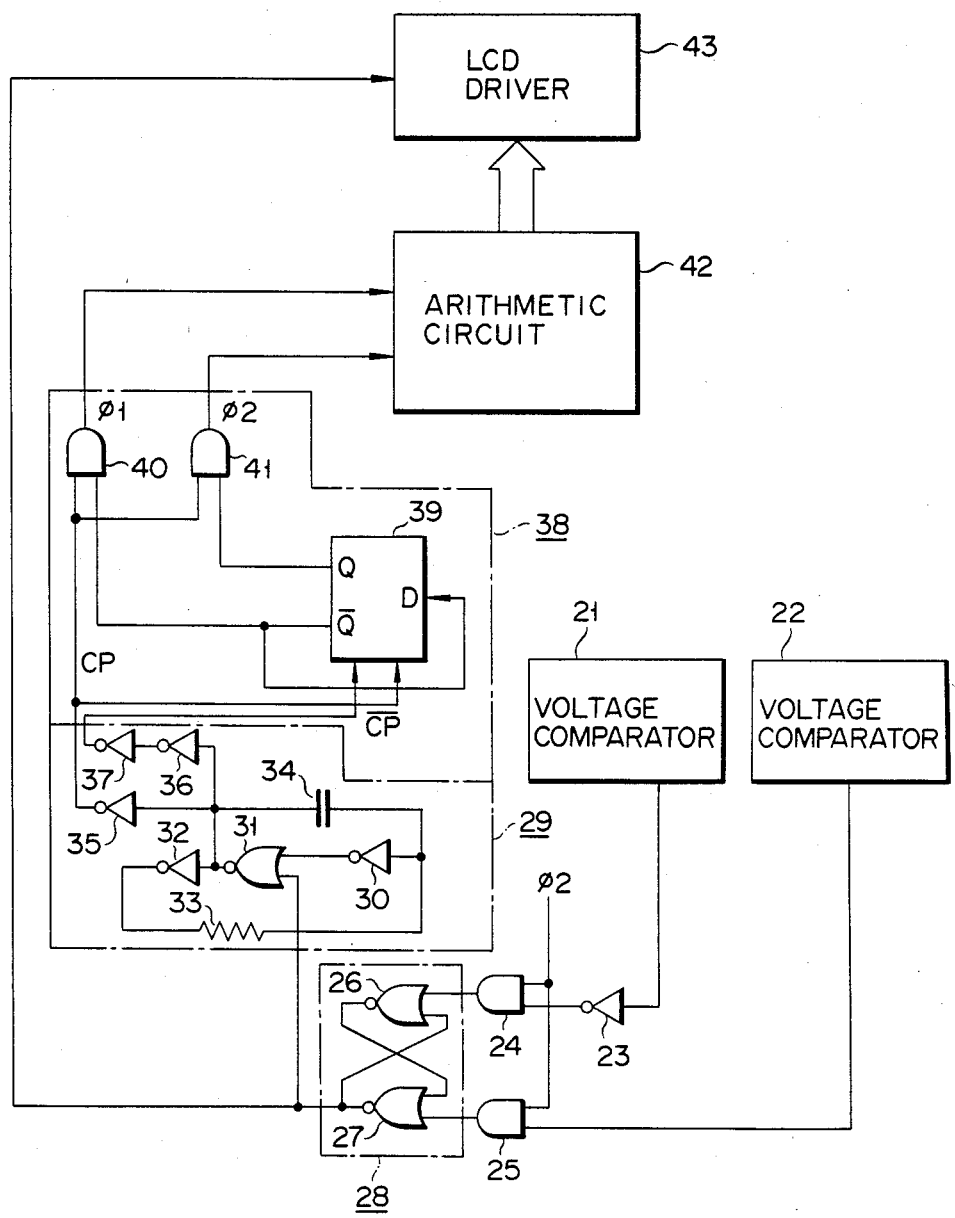
FIG. 3 is a circuit diagram of an arithmetic operation apparatus according to an embodiment of the present invention.

FIG. 3 shows the internal arrangement of an LSI 3 corresponding to the LSI 3 shown in FIG. 1. First and second voltage comparators 21 and 22 respectively compare set voltages V1 and V2 with a power source voltage $V_{DD}$ supplied to the $V_{DD}$ terminal 4 of the LSI 3. The first and second voltage comparators 21 and 22 then produce coincidence signals when the voltage V1 coincides with the power source voltage $V_{DD}$, and the voltage V2 coincides with the power source voltage $V_{DD}$, respectively. When the absolute value of the power source voltage $V_{DD}$ is greater than that of the voltage V1, the first voltage comparator 21 produces a high-level signal. When the absolute value of the power source voltage $V_{DD}$ coincides with that of the voltage V1, the first voltage comparator 21 produces a low-level signal. When the absolute value of the power source voltage $V_{DD}$ is smaller than that of the voltage V2, the second voltage comparator 22 also produces a low-level signal. However, when the absolute value of the power source voltage $V_{DD}$ coincides with that of the voltage V2, the second voltage comparator 22 produces a high-level signal.

The logic signal from the first voltage comparator 21 is supplied to one input terminal of a two-input AND gate 24 through an inverter 23. The logic signal from the second voltage comparator 22 is supplied to one input terminal of a two-input AND gate 25. A clock signal $\phi_2$ to be described later is supplied to the other input terminal of each of the AND gates 24 and 25. An output signal from the AND gate 24 is supplied to one input terminal of a two-input NOR gate 26, and an output signal from the AND gate 25 is supplied to one input terminal of a two-input NOR gate 27. The other input terminal of the NOR gate 26 is connected to the output terminal of the NOR gate 27, and the other input terminal of the NOR gate 27 is connected to the output terminal of the NOR gate 26. Thus, the NOR gates 26 and 27 constitute a flip-flop 28.

An output signal from the NOR gate 27 of the flip-flop 28 is supplied to an oscillator 29. A closed loop of an inverter 30, a two-input NOR gate 31, an inverter 32 and a resistor 33 are formed in the oscillator 29. The oscillator 29 further includes: a capacitor 34 connected between the input terminal of the inverter 30 and the output terminal of the NOR gate 31; an inverter 35 for obtaining one oscillation signal CP by inverting the output signal from the NOR gate 31; two inverters 36 and 37 which are series-connected to sequentially invert the output signal from the NOR gate 31 to obtain the other oscillation signal $\overline{CP}$. The oscillation signal $\overline{CP}$ corresponds to a signal obtained by inverting the oscillation signal CP. The output signal from the flip-flop 28 is supplied to one input terminal of the two-input NOR gate 31. In brief, the oscillator 29 comprises a CR oscillator which has the NOR gate 31 as an inhibition gate. When the output signal from the flip-flop 28 is set at a low level, the oscillator 29 is operated to produce the oscillation signals CP and $\overline{CP}$ of a predetermined frequency. However, when the output signal from the flip-flop 28 is set at a high level, the oscillator 29 is kept inoperative by means of the NOR gate 31.

The oscillation signals CP and $\overline{CP}$ from the oscillator 29 are supplied to a clock signal generator 38. The clock signal generator 38 includes a flip-flop 39 comprising a delay shift register in which a data input terminal D and an output terminal $\overline{Q}$ are coupled to each other and which is synchronized with the oscillation signals CP and $\overline{CP}$. The clock signal generator 38 further includes two two-input AND gates 40 and 41. The oscillation signal CP and the $\overline{Q}$ output signal from the flip-flop 39 are supplied to the AND gate 40 which then produces a signal $\phi_1$ which is one of two clock signals of different phases. The AND gate 41 receives the oscillation signal CP and the Q output signal from the flip-flop 39 and produces a signal $\phi_2$ which is the other of the two clock signals of different phases. The clock signals $\phi_1$ and $\phi_2$ of different phases produced by the clock signal generator 38 are supplied as sync signals to an arithmetic circuit 42. The clock signal $\phi_2$ is also supplied to the other input terminal of each of the two-input AND gates 24 and 25.

The arithmetic circuit 42 executes various types of operations in synchronism with the clock signals of different phases when a key signal is supplied from the keyboard 9. The operation results are supplied to an LCD driver 43. The LCD driver 43 converts the operation results from the arithmetic circuit 42 to display signals so as to suitably display the operation results at the LCD 10. The output signal from the flip-flop 28 is supplied to the LCD driver 43. The conversion operation of the LCD driver 43 is controlled by the output signal from the flip-flop 28.

Figure 2:
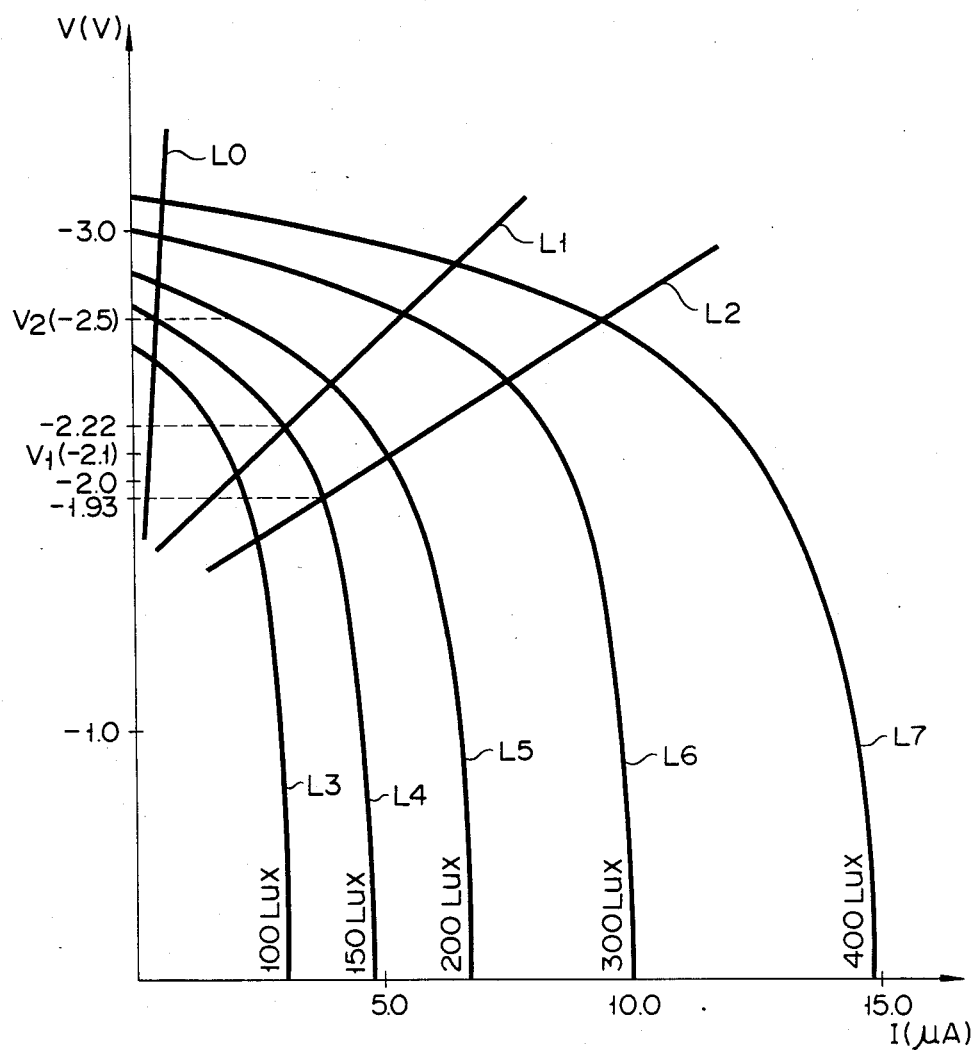
FIG. 2 is a graph showing the voltage-current characteristic curves of the conventional solar cell.

If the minimum operating voltage of the arithmetic circuit 42 is set at $-2$ V, and the solar cells 1 have the characteristics shown in FIG. 2, the voltage V1 of the first voltage comparator 21 is set at $-2.1$ V, whereas the voltage V2 of the second voltage comparator 22 is set at $-2.5$ V.

The mode of operation of the arithmetic operation apparatus having the arrangement described above will be described hereinafter. It is noted that the power source voltage $V_{DD}$ is set at a high level and the reference voltage $V_{SS}$ is set at a low level (i.e., the negative logic is adopted).

When the LSI 3 awaits a key signal (i.e., the LSI 3 is not set in the operating status) at a 150 Lux illuminance of light incident on the solar cells 1, the load characteristics of the LSI 3 are indicated by the line L1. In this condition, the power source voltage $V_{DD}$ applied to the $V_{DD}$ terminal 4 of the LSI 3 is kept at $-2.22$ V which is obtained at the intersection between the line L1 and the voltage-current characteristic curve L4 of the solar cells 1. The absolute value of the power source voltage $V_{DD}$ of $-2.22$ V is greater than that of the voltage V1 of $-2.1$ V and is smaller than that of the voltage V2 of $-2.5$ V. The first voltage comparator 21 then produces a high-level signal, whereas the second voltage comparator 22 produces a low-level signal. However, in the previous operating mode, if the output signal from the flip-flop 28 is kept low, the status of the flip-flop 28 remains unchanged. The NOR gate 31 of the oscillator 29 is not then disabled, and serves as an inverter. The oscillator 29 is then operated to sequentially produce the oscillation signals CP and $\overline{CP}$. At the same time, the clock signal generator sequentially produces the clock signals $\phi_1$ and $\phi_2$.

When a key signal is supplied from the keyboard 9 to the LSI 3, the arithmetic circuit 42 is initially set in the operating status. The load characteristics of the LSI 3 which are indicated by the line L1 are then changed to those which are indicated by the line L2. If the capacitance of the capacitor 6 shown in FIG. 1 is set at 5 $\mu$F, and an impedance between the terminals 4 and 5 of the LSI 3 is set at 200 K$\Omega$, the time constant in the transition (from L1 to L2) of load characteristics of the LSI 3 is 1 second. The power source voltage $V_{DD}$ gradually decreases from $-2.22$ V obtained at the intersection between the line L1 and the curve L4 to $-1.93$ V obtained at the intersection between the line L2 and the curve L4. The decrease in the power source voltage $V_{DD}$ is sufficiently slower than the arithmetic operation speed of the arithmetic circuit 42.

While the power source voltage $V_{DD}$ is gradually decreasing, the first voltage comparator 21 detects a coincidence between the power source voltage $V_{DD}$ and the voltage V1 of $-2.1$ V. The first voltage comparator 21 then produces a low-level signal, so that the output signal from the inverter 23 goes high. The output signal from the flip-flop 28 goes high in response to the output signal from the AND gate 24 in synchronism with the clock signal $\phi_2$ supplied thereto. When the high-level signal is supplied to the oscillator 29, the output signal from the NOR gate 31 is kept low irrespective of the output signal from the inverter 30, thereby interrupting the operation of the oscillator 29. The oscillation signal CP is kept high, whereas the oscillation signal $\overline{CP}$ is kept low. Therefore, the clock signal generator 38 stops generating the clock signals $\phi_1$ and $\phi_2$. The clock signal $\phi_1$ is kept low, whereas the clock signal $\phi_2$ is kept high. As a result, the clock signals $\phi_1$ and $\phi_2$ are not supplied to the arithmetic circuit 42, and the arithmetic operation of the arithmetic circuit 42 is interrupted, so that internal data therein is held.

When the output signal from the flip-flop 28 goes high, the LCD driver 43 is stopped. It is noted that the arithmetic circuit 42 and the LCD driver 43 are simultaneously stopped, thereby greatly decreasing current consumption. The load characteristics of the LSI 3 are changed as indicated by a line L0 in FIG. 2. Assume that the resistance of the resistor 2 is set at 1 K$\Omega$. Since the capacitance of the capacitor 6 is 5 $\mu$F, the transition speed from the load characteristics of the LSI 3 as indicated by the line L2 to those indicated by the line L0 corresponds to a time constant of 5 msec. The power source voltage $V_{DD}$ applied across the LSI 3 abruptly increases.

While the power source voltage $V_{DD}$ is increasing, the second voltage comparator 22 detects a coincidence between the power source voltage $V_{DD}$ and the voltage V2 ($-2.5$ V). The coincidence signal of a high level is then produced by the second voltage comparator 22.

Meanwhile, the clock signal $\phi_2$ is kept high after the oscillator 29 is stopped. Therefore, the high-level signal from the second voltage comparator 22 is supplied to the AND gate 25, and the output signal from the AND gate 25 goes high. When the high-level output signal from the AND gate 25 is supplied to the flip-flop 28, the output signal from the flip-flop 28 goes low. When the output signal from the flip-flop 28 goes low, the NOR gate 31 of the oscillator 29 is enabled, thereby restarting the oscillator 29. The oscillator 29 sequentially produces the oscillation signals CP and $\overline{CP}$. When these oscillation signals are then supplied to the clock signal generator 38, the clock signals $\phi_1$ and $\phi_2$ are sequentially produced by the clock signal generator 38. When these clock signals are supplied to the arithmetic circuit 42, the arithmetic circuit 42 is restarted and executes arithmetic operations in synchronism with the clock signals $\phi_1$ and $\phi_2$. In this condition, the power source voltage $V_{DD}$ is sufficiently greater than the minimum operating voltage of $-2$ V so the arithmetic circuit 42 will not operate erroneously or become inoperative. When the output signal from the flip-flop 28 goes low, the LCD driver 43 is enabled so as to receive the operation results from the arithmetic circuit 42 and to convert them to display signals.

When the power source voltage $V_{DD}$ reaches the voltage V2, the arithmetic circuit 42 and the LCD driver 43 are simultaneously started. The load characteristics of the LSI 3 which are indicated by the line L0 are changed to those indicated by the line L2 through those indicated by the line L1. Since the capacitance of the capacitor 6 is set at 5 $\mu$F and the impedance between the terminals 4 and 5 of the LSI 3 is set at 200 k$\Omega$, the time constant of the transition speed is as long as 1 second. At least four or five operations are executed by the arithmetic circuit 42 during this 1-second period. More particularly, the normal operation is completed before the power source voltage reaches the voltage V1. The LSI 3 is then set in the key signal waiting status. The load characteristics of the LSI 3 which are indicated by the line L1 are retained and may not be changed to the level as indicated by the line L2. Even if the power source voltage $V_{DD}$ should reach the voltage V1 before the arithmetic operation is completed, the output signal from the voltage comparator 21 goes low. Therefore, the above-mentioned operation is repeated, and the arithmetic operation is properly performed to its conclusion.

If the illuminance of light incident on the solar cells 1 is low and the power source voltage $V_{DD}$ decreases, the oscillator 29, the clock signal generator 38 and the arithmetic circuit 42 are temporarily stopped. While the arithmetic circuit 42 is stopped, the power source voltage $V_{DD}$ is recovered. Then, the clock signals $\phi_1$ and $\phi_2$ are generated by the clock signal generator 38 to restart the arithmetic circuit 42. Therefore, the apparatus can be stably operated across a wider intensity range of light incident on the solar cells 1.

Figure 4:
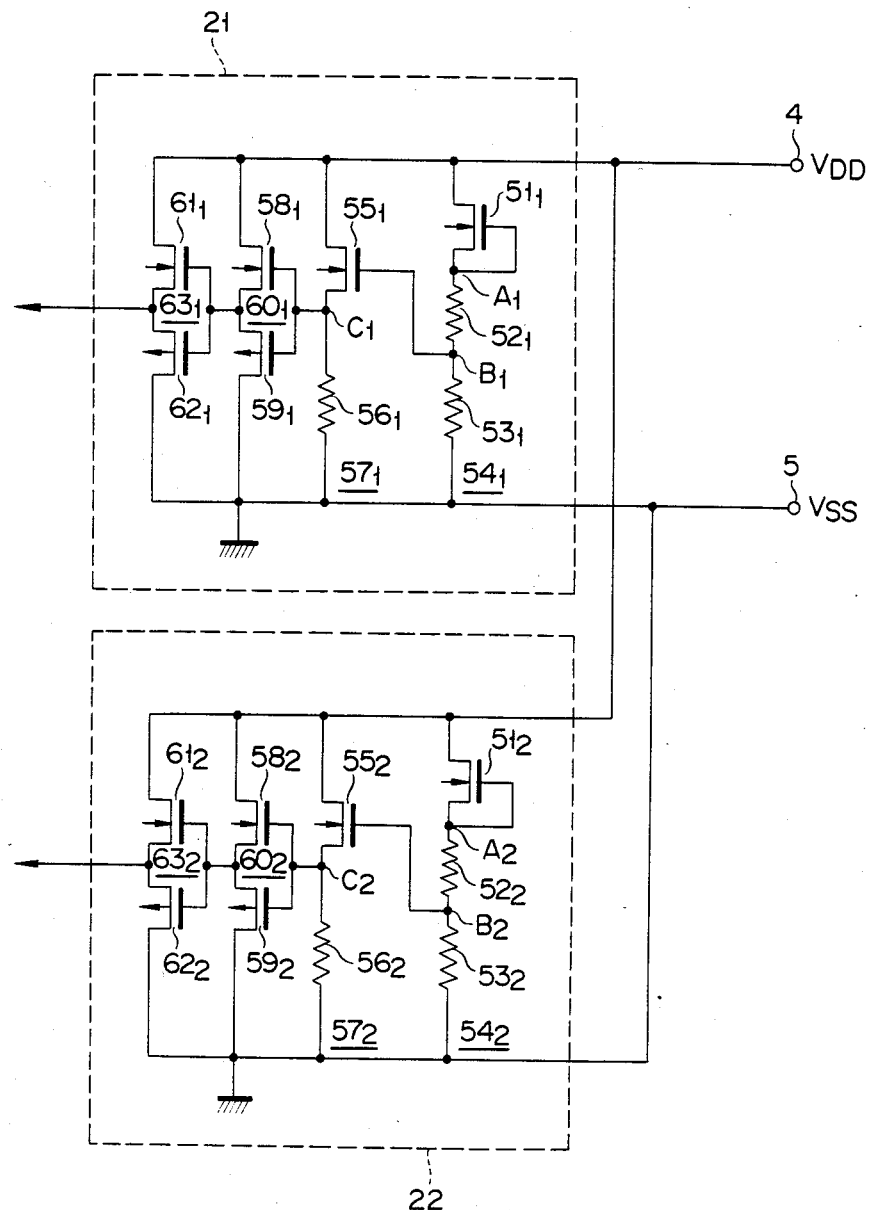
FIG. 4 is a circuit diagram of voltage comparators shown in FIG. 3.

FIG. 4 shows the detailed arrangement of the first and second voltage comparators 21 and 22 shown in FIG. 3. The first and second voltage comparators 21 and 22 have the same arrangement. The voltages V1 and V2 are respectively set in the first and second voltage comparators 21 and 22 in accordance with proper adjustments of the internal circuit constants. The first voltage comparator 21 comprises: a series circuit $54_1$ which has an n-channel MOSFET $51_1$ and resistors $52_1$ and $53_1$ and which is connected between the $V_{DD}$ terminal 4 for supplying the power source voltage $V_{DD}$ and the $V_{SS}$ terminal 5 for supplying the reference voltage $V_{SS}$; a series circuit $57_1$ which has an n-channel MOSFET $55_1$ and a resistor $56_1$ and which is connected between the $V_{DD}$ terminal 4 and the $V_{SS}$ terminal 5; a CMOS inverter $60_1$ which has an n-channel MOSFET $58_1$ and a p-channel MOSFET $59_1$ and which is connected between the $V_{DD}$ terminal 4 and the $V_{SS}$ terminal 5; and a CMOS inverter $63_1$ which has an n-channel MOSFET $61_1$ and a p-channel MOSFET $62_1$ and which is connected between the $V_{DD}$ terminal 4 and the $V_{SS}$ terminal 5. The MOSFET $51_1$ which constitutes a part of the series circuit $54_1$ has a gate and drain which are short-circuited. Therefore, the MOSFET $51_1$ serves as a constant voltage element. A voltage at a node A1 between the gate and the drain of the MOSFET $51_1$ is set at a voltage $(V_{DD}-V_{TH})$ obtained by subtracting the threshold voltage $V_{TH}$ of the MOSFET $51_1$ from the power source voltage $V_{DD}$ at the $V_{DD}$ terminal 4. The voltage at the node A1 is divided by the resistors $52_1$ and $53_1$, so that a divided voltage is supplied to the gate of the MOSFET $55_1$.

Assume that resistances of the resistors $52_1$ and $53_1$ are given as R11 and R12, respectively. A voltage $V_{B1}$ at a node B1 between the resistors $52_1$ and $53_1$ is then given as follows: $V_{B1}=(V_{DD}-V_{TH})\times R12/(R11+R12)$. The MOSFET $55_1$ of the series circuit $57_1$ which receives the voltage $V_{B1}$ at its gate is turned on/off in accordance with the voltage $V_{B1}$. Assume that the MOSFET $55_1$ is turned on in accordance with the voltage $V_{B1}$, and that the ON resistance of the MOSFET $55_1$ and the resistance of the resistor $56_1$ are given as $R_{ON1}$ and R13, respectively. A voltage at a node C1 between the MOSFET $55_1$ and the resistor $56_1$ is given as follows: $V_{C1}=V_{DD}\times R13/(R_{ON1}+R13)$. A gate-source voltage $|V_{GS1}|$ is equal to $|V_{DD}|-|V_{B1}|$. When the power source voltage $V_{DD}$ comes close to 0 V, the gate-source voltage $|V_{GS1}|$ decreases, and the ON resistance $R_{ON1}$ of the MOSFET $55_1$ increases. A change in the ON resistance $R_{ON1}$ of the MOSFET $55_1$ can be controlled by properly selecting the resistance R13. Therefore, when the power source voltage $V_{DD}$ comes close to 0 V and reaches a predetermined voltage, the voltage $V_{C1}$ at the node C1 can be controlled to abruptly come close to 0 V. The voltage $V_{C1}$ is sequentially inverted and amplified by the CMOS inverters $60_1$ and $63_1$. If the power source voltage $V_{DD}$ decreases, and the voltage $V_{C1}$ crosses the threshold voltage of the CMOS inverter $60_1$, the output signal from the CMOS inverter $60_1$ goes high level ($V_{DD}$ level). The output signal from the CMOS inverter $63_1$ then goes low ($V_{SS}$ level).

However, when the power source voltage $V_{DD}$ increases, and the voltage $V_{C1}$ crosses the threshold voltage of the CMOS inverter $60_1$ in the opposite direction, the output signal from the CMOS inverter $60_1$ goes low, and the output signal from the CMOS inverter $63_1$ goes high.

In this manner, the first voltage comparator 21 compares the internal set voltage with the power source voltage $V_{DD}$ and produces a logic signal in accordance with a comparison result. In this case, in order to set the internal set voltage to V1, the resistance R13 of the resistor $56_1$ and any other circuit constant such as the threshold voltage of the MOSFET $55_1$ can be properly determined.

The second voltage comparator circuit 22 comprises: a series circuit $54_2$ which has an n-channel MOSFET $51_2$ and resistors $52_2$ and $53_2$; a series circuit $57_2$ which has an n-channel MOSFET $55_2$ and a resistor $56_2$; a CMOS inverter $60_2$ which comprises an n-channel MOSFET $58_2$ and a p-channel MOSFET $59_2$; and a CMOS inverter $63_2$ which comprises an n-channel MOSFET $61_2$ and a p-channel MOSFET $62_2$. In order to set the internal set voltage to V2 in the second voltage comparator 22, the resistance of the resistor $56_2$, the threshold voltage of the MOSFET $55_2$ and the like may be properly determined in the same manner as for the first voltage comparator 21.

In the above embodiment, the present invention is applied to a compact electronic calculator. However, the present invention can also be applied to any other arithmetic operation apparatus using solar cells as a power source.

What is claimed is:

1. An arithmetic operation apparatus using solar cells as a power source, comprising:

capacitor means, connected to said solar cells, for smoothing the power output of said solar cells;

arithmetic operating means, connected to said capacitor means to receive a voltage generated by said solar cells as a power source voltage, for executing various types of operations;

clock signal generating means for generating clock signals to be used as synchronization signals in said arithmetic operating means;

voltage comparator means for compairing said power source voltage with a first set voltage and with a second set voltage, the absolute value of said first set voltage being smaller than the absolute value of said second set voltage, said first set voltage being set to be close to a minimum value above which erroneous operation of said arithmetic operating means will not occur; and controlling means for interrupting the generation of said clock signals by said clock signal generating means when said voltage comparator means determines a coincidence between said first set voltage and said power source voltage, and for restarting said clock signal generating means when said voltage comparator means determines a coincidence between said second set voltage and said power source voltage after a clock signal interruption.

2. An apparatus according to claim 1, wherein said voltage comparator means comprises:

a first voltage comparator for comparing the first set voltage with the power source voltage to produce a high-level logic signal when the power source voltage is greater than the first set voltage and to produce a low-level logic signal when the power source voltage coincides with the first set voltage; and a second voltage comparator for comparing the second set voltage with the power source voltage to produce a low-level logic signal when the power source voltage is smaller than the second set voltage and to produce a high-level logic signal when the power source voltage coincides with the second set voltage.

3. An apparatus according to claim 1, wherein said controlling means comprises a flip-flop which is controlled in accordance with logic signals from said voltage comparator means.

* * * * *